J. J. MAHONEY.
LOCK FOR AUTOMOBILES.
APPLICATION FILED FEB. 13, 1920.
1,438,656.
Patented Dec. 12, 1922.
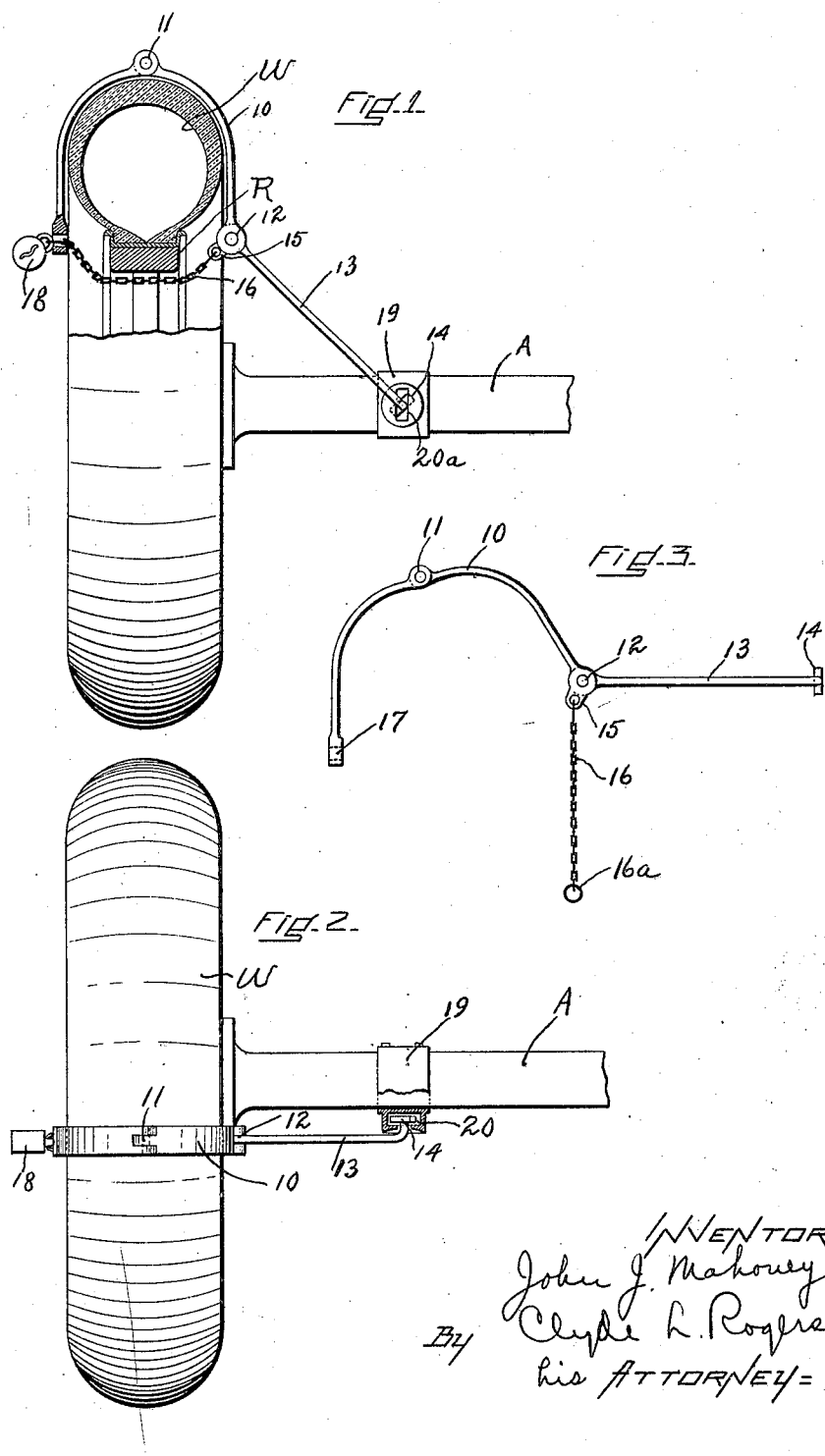

Patented Dec. 12, 1922.

1,438,656

UNITED STATES PATENT OFFICE.

JOHN J. MAHONEY, OF MEDFORD, MASSACHUSETTS.

LOCK FOR AUTOMOBILES.

Application filed February 13, 1920. Serial No. 358,457.

*To all whom it may concern:*

Be it known that I, JOHN J. MAHONEY, a citizen of the United States, and resident of Medford, county of Middlesex, Commonwealth of Massachusetts, have invented an Improvement in Locks for Automobiles, of which the following description, in connection with the accompanying drawings, is a specification, like characters on the drawings representing like parts in each of the several views.

This invention relates to devices for securing automobiles and other vehicles from theft, or tampering with by unauthorized persons. A principal object of the invention is to provide a simple and easily applied, but yet reliable device, that is adapted for engagement with the wheel of a vehicle and to hold the machine from moving. A further object is to provide a simple and inexpensive type of device that may be quickly and easily removed bodily from its operative position to be stored away, and as quickly applied and ready for operation. The foregoing and other objects and advantages of the invention will more fully appear from the following detailed description, and the distinctive features of novelty will thereafter be pointed out in the appended claims.

Referring to the drawings:

Fig. 1 is a plan view showing a portion of the front axle and a wheel of an automobile with my device in operative position, a portion of the wheel being broken away in section;

Fig. 2 is an elevation looking from the front of the machine; and,

Fig. 3 is an elevation of the device removed.

10 indicates a stout clasp made in the form of a yoke with the two members thereof pivoted together at 11 and adapted to encircle the outer portion of the tire and rim of a vehicle wheel. One of the members of this clasp is pivoted at 12 to a bar 13 of a length to extend diagonally downward to a point on the axle some little distance inward from the wheel and the extremity of this bar is equipped with a T-head 14. The extremity of one clasp member is formed with an apertured lug 15 to which is secured one end of a chain or like flexible member 16. The other end of this chain is adapted to be engaged through an opening 17 in the other clasp or yoke member and held from removal therefrom by a suitable lock 18 which may be engaged in a ring 16ª at the extremity of the chain 16. The axle A has secured thereto a band clamp 19 having at one side thereof, preferably at the front, a socket 20 for receiving the T-head 14. This socket has at the front thereof an elongated slot 20ª of a dimension such that the T-head 14 may be slipped therethrough into the socket 20 when the bar 13 is in inoperative position, e. g. as shown in parallelism with the axle but so that upon the moving of the bar 13 to operative position as shown in Fig. 1, the T-head 14 will be turned angularly cross-wise of the slot 20ª to hold it from removal. In use, when it is desired to apply the device, the T-head 14 is first inserted in the slot 20ª and then the bar 13 is swung angularly of the axle, i. e. outward toward the rim and the clasp or yoke 10 is fitted around the tire and rim of the wheel W. Then the chain 16 is passed through the wheel within the rim R and secured through the hole 17 to the other end of the clasp by means of the lock 18. It is to be noted that any suitable lock may thus be employed with the device, the only requirement being a locking member that will prevent removal of the chain 16. The device may be instantly taken off by releasing the lock 18, swinging the clasp away from the wheel and turning the bar 13 again into parallelism with the axle. So long as the clasp remains on the wheel rim however, it is quite impossible to remove the T-head 14 from its socket and thus the device cannot be tampered with or removed. The described construction is strong and reliable for preventing unauthorized tampering with a machine, and even should it be possible to dislocate the bar 13 of the clamp sleeve 19, the device is still held secure onto the wheel rendering it impracticable to operate the machine. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention what I claim as new and desire to secure by Letters Patent is:

1. A locking device for automobiles or the like adapted for engagement with an axle and wheel rim of the vehicle, comprising a clasp adapted to be fitted to a wheel rim, and equipped with a lock to hold the same from displacement, a bar pivotally engaged with said clasp, and having a T-head, and a socket member adapted to be fixed to an axle having an elongated slot adapted to receive said T-head with said clasp in inoperative position, but having said T-head extending thereacross to prevent removal thereof with said clasp in operative position.

2. A locking device for automobiles adapted for engagement with an axle and wheel rim of the vehicle, comprising a pivoted clasp adapted to be fitted to a wheel rim with a flexible member securing the clasp members together and equipped with a lock, a bar pivoted to one of said clasp members and extending diagonally inward to the wheel axle when in operative position, said bar having a T-head at its end, and a socket fixed to the axle having an elongated slot therein adapted to receive said T-head but to prevent removal thereof with said clasp in operative position.

3. A locking apparatus for vehicles comprising an arm having a head movably connected to the vehicle, a hasp member pivoted to the opposite end of the arm said hasp member being adapted to be locked to the arm and around a portion of a wheel of the vehicle to prevent disengagement of said head from the vehicle.

4. A locking apparatus for vehicles comprising a bearing plate carried by the vehicle adjacent one of the wheels of said vehicle, said plate having a slot, a holding arm having a bearing head on one end adapted to be extended through the slot in one position and disposed laterally of the slot in another position, a hasp arm movably connected to the other end of the holding arm and adapted to engage a wheel of the vehicle, and means for locking said hasp arm to the holding arm to prevent removal of the bearing head and arm from the plate.

In testimony whereof, I have signed my name to this specification.

JOHN J. MAHONEY.